2,820,794

5-THIOCARBAMYLIMINO-4-SUBSTITUTED-Δ²-1,3,4-THIADIAZOLINE-2-SULFONAMIDES

Richard William Young, Riverside, and Melinda Jane Muller, Stamford, Conn., assignors to American Cyanamid Company, New York, N. Y., a corporation of Maine No Drawing. Application August 13, 1956
Serial No. 603,842

12 Claims. (Cl. 260—306.8)

This invention relates to new organic compounds and more particularly it is concerned with novel 5-thiocarbamylimino-4-substituted-Δ²-1,3,4-thiadiazoline-2 - sulfonamides which may be represented by the following general formula:

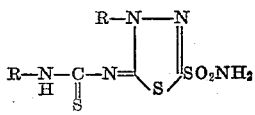

wherein R is a lower alkyl radical, a monocyclic aryl radical or a monocyclic aralkyl radical. Suitable lower alkyl substituents are methyl, ethyl, propyl, isopropyl, butyl, pentyl, amyl, hexyl, etc.; suitable aralkyl substituents are benzyl, phenethyl, phenylpropyl, phenylbutyl, etc.; and suitable aryl substituents are phenyl and substituted phenyl, suitable substituents on the phenyl ring being —Cl, —Br, —I, —NO₂, —OCH₃, and lower alkyl radicals containing from 1 to 4 carbon atoms.

The compounds of this invention may be prepared by reacting a suitable isothiocyanate with an appropriate 5-imino-4-substituted-Δ²-1,3,4-thiadiazoline-2-sulfonamide in the presence of a basic organic solvent such as pyridine by heating to temperatures of the order of from room temperature to about 150° C. Other suitable solvents for this reaction in addition to pyridine are dimethylamine, tributylamine, quinoline, lutidine, etc.

Suitable isothiocyanates used in this reaction are, for example, methylisothiocyanate, ethylisothiocyanate, butylisothiocyanate, isobutylisothiocyanate, n-valerylisothiocyanate, allylisothiocyanate, phenylisothiocyanate, p-chlorophenylisothiocyanate, p-acetamidophenylisothiocyanate, m-methoxyphenylisothiocyanate, m-tolylisothiocyanate, 2-naphthylisothiocyanate and benzylisothiocyanate.

The 5-imino-4-substituted-Δ²-1,3,4-thiadiazoline-2-sulfonamides which are used as starting materials for the products of this invention are preferably prepared by the acid hydrolysis of 5-acylimino-4-substituted-Δ²1,3,4-thiadiazoline-2-sulfonamides which are more particularly described and claimed in the copending application of Young, Wood and Vaughan, Serial No. 492,297, filed March 4, 1955, now Patent No. 2,783,241, and in the copending application of Young and Muller, Serial No. 560,866, filed January 23, 1956, now Patent No. 2,783,239. Among the suitable 5-imino-4-substituted-Δ²-1,3,4-thiadiazoline-2-sulfonamides which may be used in carrying out this invention there may be mentioned 5-imino-4-methyl-Δ²-1,3,4-thiadiazoline-2 - sulfonamide, 5-imino-4-ethyl-Δ²-1,3,4-thiadiazoline - 2 - sulfonamide, 5-imino-4-benzyl-Δ²-1,3,4-thiadiazoline - 2 - sulfonamide, 5-imino-4-phenyl-Δ²-1,3,4-thiadiazoline - 2 - sulfonamide, 5-imino-4-(m-tolyl)-Δ²-1,3,4-thiadiazoline-2-sulfonamide, 5-imino-4-(p-chlorophenyl)-Δ²-1,3,4-thiadiazoline-2-sulfonamide, 5-imino-4-(p-acetamidophenyl)-Δ²-1,3,4-thiadiazoline-2-sulfonamide, 5-imino-4-(m-methoxyphenyl)-Δ²-1,3,-4-thiadiazoline-2-sulfonamide, etc.

The process by which the novel compounds of this invention may be prepared is illustrated schematically below using 5-imino-4-methyl-Δ²-1,3,4-thiadiazoline-2-sulfonamide as an example of a suitable 5-imino-4-substituted-Δ²-1,3,4-thiadiazoline-2-sulfonamide compound and phenylisothiocyanate as an example of a suitable isothiocyanate.

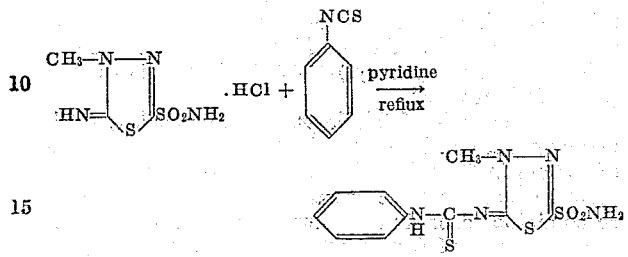

The invention will be described in greater detail in conjunction with the following specific examples in which the parts are by weight unless otherwise specified.

Example 1

A solution of 4.6 parts of 5-imino-4-methyl-Δ²-1,3,4-thiadiazoline-2-sulfonamide hydrochloride and 2.7 parts of phenylisothiocyanate in 25 parts of pyridine are refluxed for three hours. After pouring the solution onto ice and water, 5.8 parts (88%) of solid, M. P. 215–220° dec., are obtained. After several recrystallizations from 2B alcohol or 95% alcohol, 3 parts (45%) M. P. 218–219° dec., of 5-(N-phenylthiocarbamyl)-imino-4-methyl-Δ²-1,3,4-thiadiazoline-2-sulfonamide are recovered.

Example 2

The procedure of the preceding example is repeated with the exception that an equivalent quantity of methylisothiocyanate is used. 5-(N-methylthiocarbamyl)-imino-4-methyl-Δ²-1,3,4-thiadiazoline-2-sulfonamide is produced.

Example 3

The procedure of Example 1 is followed except that an equivalent quantity of 5-imino-4-benzyl-Δ²-1,3,4-thiadiazoline-2-sulfonamide is used. 5-(N-phenylthiocarbamyl)-imino-4-benzyl-Δ²-1,3,4-thiadiazoline-2 - sulfonamide is obtained.

Example 4

Following the procedure of Example 1, a solution of 5-imino-4-phenyl-Δ²-1,3,4-thiadiazoline-2-sulfonamide hydrochloride and propylisothiocyanate in dimethylaniline are heated on the steam bath for 3 hours. 5-(N-propylthiocarbamyl)-imino-4-phenyl-Δ²-1,3,4-thiadiazoline - 2-sulfonamide is produced.

Example 5

Following the procedure of Example 1, a solution of 5-imino-4-(m-tolyl)-Δ²-1,3,4-thiadiazoline-2 - sulfonamide hydrocholride and phenylisothiocyanate are refluxed in reagent pyridine for 3 hours. 5-(N-phenylthiocarbamyl-imino-4-(m-tolyl)-Δ²-1,3,4-thiadiazoline-2-sulfonamide is produced.

Example 6

The procedure of the preceding examples is repeated using equivalent quantities of 5-imino-4-(p-chlorophenyl)-Δ²-1,3,4-thiadiazoline - 2 - sulfonamide and benzylisothiocyanate. 5-(N-benzylthiocarbamyl)-imino-4 - (p-chlorophenyl)-Δ²-1,3,4-thiadiazoline-2-sulfonamide is produced.

Example 7

The procedure of Example 1 is followed with the exception that an equivalent quantity of 5-imino-4-(p-acetamidophenyl)-Δ²-1,3,4-thiadiazoline - 2 - sulfonamide is used in place of the 5-imino-4-methyl compound used in Example 1. 5-(N-phenylthiocarbamyl)-imino-4-(p-acetamidophenyl)-Δ²-1,3,4-thiadiazoline-2-sulfonamide is obtained.

*Example 8*

The procedure of Example 1 is followed with the exception that an equivalent quantity of 5-imino-4-(m-methoxyphenyl)-Δ²-1,3,4-thiadiazoline - 2 - sulfonamide is used in place of the 5-imino-4-methyl compound of Example 1 and an equivalent quantity of chlorophenylisothiocyanate is used instead of the phenylisothiocyanate used in Example 1. 5-(N-p-chlorophenylthiocarbamyl)-imino-4-(m-methoxyphenyl)-Δ²-1,3,4-thiadiazoline-2 - sulfonamide is obtained.

The compounds of this invention are excellent natriuretic agents, that is agents which enhance the excretion of sodium in the urine without necessarily changing the normal volume of urine excreted. The compounds may be administered orally and have been found to be effective in dosages of from 5 mg. to 100 mg. per kilogram of body weight.

We claim:

1. 5-thiocarbamylimino-4-substituted-Δ²-1,3,4-thiadiazoline-2-sulfonamides of the formula:

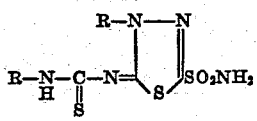

wherein R is a member selected from the group of lower alkyl, phenyl, halo-substituted phenyl, nitro-substituted phenyl, amido-substituted phenyl, lower alkoxy-substituted phenyl, lower alkyl-substituted phenyl, and phenyl-lower-alkyl radicals.

2. 5-(N-phenylthiocarbamyl)-imino-4-methyl-Δ²-1,3,4-thiadiazoline-2-sulfonamide.

3. 5-(N-methylthiocarbamyl)-imino-4-methyl-Δ²-1,3,4-thiadiazoline-2-sulfonamide.

4. 5-(N-phenylthiocarbamyl)-imino-4-benzyl-Δ²- 1,3,4-thiadiazoline-2-sulfonamide.

5. 5-(N-propylthiocarbamyl)-imino-4-phenyl-Δ²- 1,3,4-thiadiazoline-2-sulfonamide.

6. 5-(N-phenylthiocarbamyl)-imino - 4 - (m-tolyl) - Δ²- 1,3,4-thiadiazoline-2-sulfonamide.

7. The method of preparing 5-thiocarbamylimino-4-substituted-Δ²-1,3,4-thiadiazoline - 2 - sulfonamides of the formula:

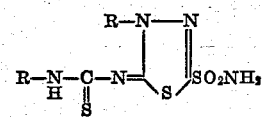

wherein R is a member selected from the group consisting of lower alkyl, phenyl, halo-substituted phenyl, nitro-substituted phenyl, amido-substituted phenyl, lower alkoxy-substituted phenyl, lower alkyl-substituted phenyl, and phenyl-lower-alkyl radicals which comprises reacting a 5-imino-4-substituted-Δ²-1,3,4-thiadiazoline-2 - sulfonamide of the formula:

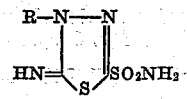

wherein R has the same meaning as above with a corresponding isothiocyanate in the presence of a basic organic solvent under reflux conditions.

8. The method of preparing 5-(N-phenylthiocarbamyl)-imino-4-methyl-Δ²-1,3,4 - thiadiazoline - 2 - sulfonamide which comprises reacting 5-imino-4-methyl-Δ²-1,3,4-thiadiazoline-2-sulfonamide with phenylisothiocyanate in the presence of a basic organic solvent.

9. The method of preparing 5-(methylthiocarbamyl)-imino-4-methyl-Δ²-1,3,4 - thiadiazoline - 2 - sulfonamide which comprises reacting 5-imino-4-methyl-Δ²-1,3,4-thiadiazoline-2-sulfonamide with methylisothiocyanate in the presence of a basic organic solvent.

10. The method of preparing 5-(N-phenylthiocarbamyl)-imino-4-benzyl-Δ²-1,3,4-thiadiazoline - 2 - sulfonamide which comprises reacting 5-imino-4-benzyl-Δ²-1,3,4-thiadiazoline-2-sulfonamide with phenylisothiocyanate in the presence of a basic organic solvent.

11. The method of preparing 5-(N-propylthiocarbamyl)imino-4-phenyl-Δ²-1,3,4-thiadiazoline - 2 - sulfonamide which comprises reacting 5-imino-4-phenyl-Δ²-1,3,4-thiadiazoline-2-sulfonamide with propylisothiocyanate in the presence of a basic organic solvent.

12. The method of preparing 5-(N-phenylthiocarbamyl)-imino-4-(m-tolyl)-Δ²-1,3,4-thiadiazoline-2-sulfonamide which comprises reacting 5-imino-4-(m-tolyl)-Δ²-1,3,4-thiadiazoline-2-sulfonamide with phenylisothiocyanate in the presence of a basic organic solvent.

No references cited.